United States Patent [19]

Watanabe

[11] Patent Number: 4,577,238
[45] Date of Patent: Mar. 18, 1986

[54] CIRCUIT FOR REDUCING INTERMODULATION DISTORTION IN A FREQUENCY-MODULATED SIGNAL

[75] Inventor: Yasuaki Watanabe, Kasukabe, Japan
[73] Assignee: Victor Company of Japan, Ltd., Yokohama, Japan
[21] Appl. No.: 487,686
[22] Filed: Apr. 22, 1983

[30] Foreign Application Priority Data

Apr. 30, 1982 [JP] Japan ................................. 57-73543

[51] Int. Cl.$^4$ ...................... H04N 5/91; H04N 5/213; H03B 19/00; H03B 1/00; H04B 1/10
[52] U.S. Cl. .................................... 358/340; 455/308; 307/555; 328/162; 358/167
[58] Field of Search ................. 358/327, 343, 36, 330, 358/310, 328, 335, 340, 167; 360/19.1, 20, 30; 455/210, 205, 308; 307/555, 562; 328/162, 163, 139; 329/130, 131, 134

[56] References Cited

U.S. PATENT DOCUMENTS

| | | | |
|---|---|---|---|
| 3,243,604 | 3/1966 | Johnson | 455/308 X |
| 3,832,638 | 8/1974 | Ohashi et al. | 325/347 |
| 3,893,163 | 7/1975 | Wessels et al. | 358/330 |
| 3,972,064 | 7/1976 | Keizer | 358/343 X |
| 3,988,532 | 10/1976 | Korpel | 358/340 |
| 4,005,474 | 1/1977 | Keizer | 358/343 X |
| 4,280,219 | 7/1981 | Lowenschuss et al. | 375/4 |
| 4,329,712 | 5/1982 | Lang | 358/167 X |
| 4,360,829 | 11/1982 | Riddle | 358/340 |

FOREIGN PATENT DOCUMENTS 2045363  4/1971  Fed. Rep. of Germany .
2817387 11/1978  Fed. Rep. of Germany .
2358797  2/1978  France .
1408540 10/1975  United Kingdom .
2061647  5/1981  United Kingdom .

OTHER PUBLICATIONS

M. R. de Haan, "Signal Processing in Optical Video Disc Recording", *Television*, vol. 16, No. 5, pp. 23–27, Sep.–Oct. 1976.
RCA Review, vol. 39, No. 1, Mar. 1978, pp. 35–59, Princeton (USA); J. K. Clemens: "Capacitive Pickup and the Burried Subcarrier Encoding System for the RCA Videodisc".
Patents Abstracts of Japan, vol. 5, No. 55 (E-52) (727), Apr. 16, 1981.

*Primary Examiner*—James J. Groody
*Assistant Examiner*—Michael P. Dunnam
*Attorney, Agent, or Firm*—Ladas & Parry

[57] ABSTRACT

An intermodulation distortion reducing circuit for a frequency-modulated signal comprises a sinusoidal wave shaping circuit supplied with an input frequency-modulated signal including an intermodulation distortion component, for shaping the waveform of the input frequency-modulated signal into a waveform closely approximating a sinusoidal wave, and a mean DC level detecting circuit supplied with an output signal of the sinusoidal wave shaping circuit, for detecting a mean DC level of the output signal of the sinusoidal wave shaping circuit and producing a detection output. The sinusoidal wave shaping circuit is supplied with the detection output of the mean DC level detecting circuit and a waveform shaping quantity thereof is varied to obtain the waveform closely approximating the sinusoidal waveform. The sinusoidal wave shaping circuit produces a frequency-modulated signal having a waveform closely approximating a sinusoidal waveform, with its intermodulation distortion component reduced.

6 Claims, 9 Drawing Figures

CIRCUIT FOR REDUCING INTERMODULATION DISTORTION IN A FREQUENCY-MODULATED SIGNAL

BACKGROUND OF THE INVENTION

The present invention generally relates to circuits for reducing intermodulation distortions in frequency-modulated signals, and more particularly to an intermodulation distortion reducing circuit having a simple circuit construction and capable of reducing intermodulation distortion in a frequency-modulated signal.

Generally, apparatuses which record an information signal comprising a color video signal and an audio signal onto a rotary recording medium (hereinafter simply referred to as a disc) as existence or non-existence of pits, that is, as variation in convex and concave configuration, and reproduce the recorded information signal from the disc by a system using variation in the electrostatic capacitance between a reproducing element and the disc or a system using a light beam, have been reduced to practice. However, when recording the information signal onto the disc and forming the disc, it is impossible to form the pits with accurate convex and concave configuration, and the shapes of the pits are not perfect. For example, in the electrostatic capacitance type system, the recorded signal is reproduced by detecting the variation in the electrostatic capacitance between an electrode of a reproducing stylus and the disc, because the electrostatic capacitance varies according to variation in the convex and concave configuration on the surface of the disc. In such an electrostatic capacitance type system, the variation in the electrostatic capacitance is not affected by the shape of a concave region which is considerably separated from the electrode of the reproducing stylus, and the waveform of the reproduced signal is affected by the shape of a convex region which is contiguous to the electrode of the reproducing stylus. Accordingly, the signal reproduced from this type of a disc includes distortion according to the abnormal shape of the convex formed on the surface of the disc.

If the information signal is recorded onto the disc according to a constant angular velocity system, the size of the pits formed on the disc becomes smaller towards the inner periphery of the disc, because the linear speed decreases towards the inner periphery of the disc. Hence, generation of an intermodulation distortion is especially notable in the signal reproduced from the inner peripheral part of the disc.

On the other hand, the information signal recorded onto the disc is obtained in the following manner. That is, a frequency-modulated audio signal, which is obtained by frequency-modulating a carrier by an audio signal, is multiplexed with a color video signal in different bands. A carrier of a predetermined frequency is frequency-modulated by the multiplexed signal, and the information signal is recorded onto the disc in the form of this frequency-modulated multiplexed signal.

When the intermodulation distortion is introduced in the frequency-modulated multiplexed signal reproduced from the disc, an intermodulation distortion component of one of the color video signal and the frequency-modulated audio signal or intermodulation distortion components of both the color video signal and the frequency-modulated audio signal, may become mixed within the band of the other signal or mixed into their mutual bands. In this case, if such a frequency-modulated multiplexed signal is demodulated, degradation is introduced in the picture quality of the reproduced picture, the sound quality of the reproduced sound, and the like, due to beat interference introduced by the above mixture of the intermodulation distortion components.

Accordingly, it is necessary to reduce and eliminate the intermodulation distortion before the reproduced frequency-modulated multiplexed signal is demodulated. However, although the intermodulation distortion in the high frequencies can be eliminated by simply passing the reproduced frequency-modulated multiplexed signal through a lowpass filter, it is impossible to eliminate the intermodulation distortion mixed within the required side-bands. Thus, a circuit for reducing the intermodulation distortion cannot be realized by use of a lowpass filter alone.

SUMMARY OF THE INVENTION

Accordingly, it is a general object of the present invention to provide a novel and useful intermodulation distortion reducing circuit for reducing intermodulation distortion in a frequency-modulated signal, in which the intermodulation distortion in the frequency-modulated signal can be positively reduced.

Another and more specific object of the present invention is to provide an intermodulation distortion reducing circuit for reducing intermodulation distortion in a frequency-modulated signal, which clips a frequency-modulated signal including intermodulation distortion, so that the duty cycle of the frequency-modulated signal with respect to a mean DC level becomes approximately equal to 50%, in order to carry out wave-shaping to obtain a substantially sinusoidal wave and reduce and eliminate the intermodulation distortion. According to the circuit of the present invention, the intermodulation distortion in the frequency-modulated signal can be positively eliminated. Hence, in a case where the frequency-modulated signal is a signal obtained by frequency-modulating a carrier by a multiplexed signal which is obtained by multiplexing a color video signal and a frequency-modulated audio signal, it is possible to prevent the introduction of beat interference between the two signals, and it is therefore possible to obtain a reproduced picture of superior picture quality and reproduced sound of superior sound quality.

Other objects and further features of the present invention will be apparent from the following detailed description when read in conjunction with the accompanying drawings.

DETAILED DESCRIPTION

Figure 1:
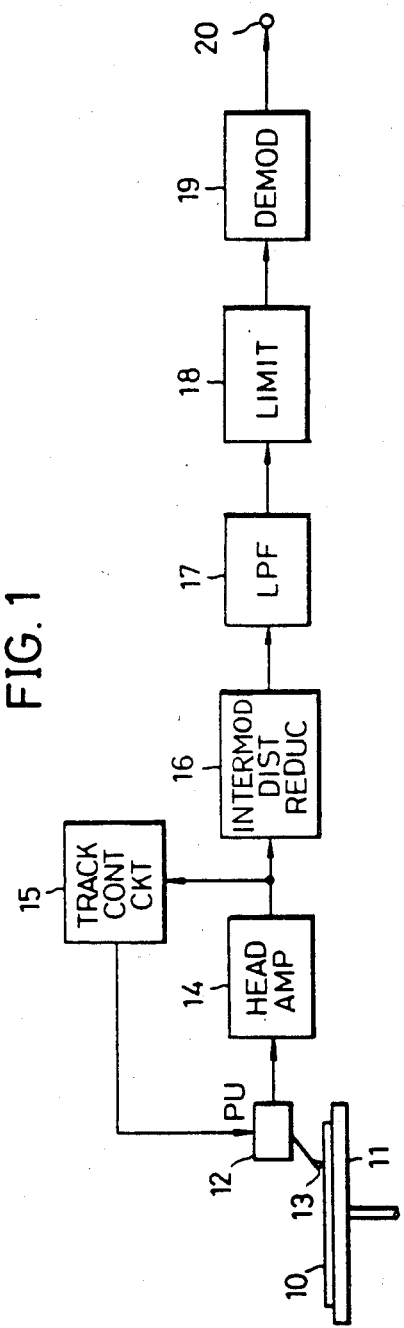
FIG. 1 is a systematic block diagram showing an embodiment of a rotary recording medium reproducing apparatus provided with an intermodulation distortion reducing circuit according to the present invention.

A block system of an embodiment of a rotary recording medium reproducing apparatus provided with an intermodulation distortion reducing circuit according to the present invention, is shown in FIG. 1. A disc 10 is recorded with a frequency-modulated multiplexed signal of an information signal comprising a color video signal and an audio signal, is placed onto a turntable 11 and rotated at a predetermined rotational speed.

A reproducing stylus 13 of a signal pickup device 12 makes contact with a recording surface of the rotating disc 10, to pickup and reproduce the recorded frequency-modulated multiplexed signal from the disc 10. In the present embodiment of the invention, the frequency-modulated multiplexed signal is recorded on the disc 10 as variation in geometrical configuration, and the recorded frequency-modulated multiplexed signal is reproduced according to variation in the electrostatic capacitance between the disc 10 and an electrode of the reproducing stylus 13. Reference signals for tracking control are also recorded on the disc 10 besides the frequency-modulated multiplexed signal, and these reference signals are reproduced together with the frequency-modulated multiplexed signal.

The signals thus picked up and reproduced from the disc 10 is passed through a head amplifier 14, and then supplied to a tracking control circuit 15 and an intermodulation distortion reducing circuit 16 according to the present invention. The reference signals for tracking control are separated at the tracking control circuit 15, and a tracking control signal is formed from these separated reference signals. This tracking control signal is supplied to a tracking control coil within the signal pickup device 12, and a tracking control operation is carried out so that the reproducing stylus 13 accurately follows the video signal track.

On the other hand, the picked up frequency-modulated multiplexed signal is supplied to the intermodulation distortion reducing circuit 16 wherein the intermodulation distortion component is reduced as will be described hereinafter. The information signal from which the frequency-modulated multiplexed signal which is recorded onto and reproduced from the disc 10, has a frequency spectrum shown in FIG. 2, for example. The information signal comprises a color video signal having a luminance signal occupying a band Y from zero to 3 MHz and a carrier chrominance signal occupying a band C of ±500 kHz about a chrominance subcarrier frequency of 2.56 MHz, a first frequency-modulated audio signal occupying a band A1 obtained by frequency-modulating a carrier having a frequency of 3.43 MHz by a first-channel audio signal, and a second frequency-modulated audio signal occupying a band A2 obtained by frequency-modulating a carrier having a frequency of 3.73 MHz by a second-channel audio signal. The luminance signal Y of the color video signal is obtained by band-limiting a luminance signal of the normal NTSC system color video signal so that the upper limit frequency becomes equal to 3 MHz. The carrier chrominance signal C is obtained by frequency-converting a carrier chrominance signal having a chrominance subcarrier frequency of 3.58 MHz into a low band, to a frequency of 2.56 MHz which is 5/7 the frequency of 3.58 MHz. The carrier chrominance signal is band-share-multiplexed with the high frequency range of the luminance signal Y. The first and second frequency-modulated audio signals A1 and A2 are multiplexed at a high frequency range so as not to overlap with the luminance signal Y.

Figure 2:
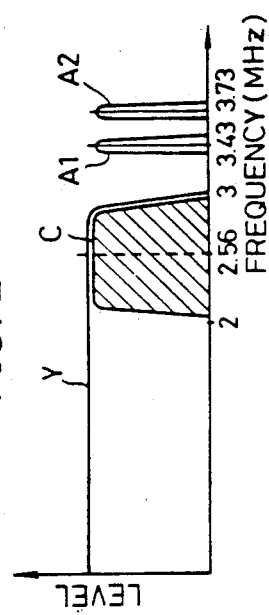
FIG. 2 is a graph showing a frequency spectrum of a multiplexed signal which is to be recorded onto the rotary recording medium shown in FIG. 1.
Figure 3:
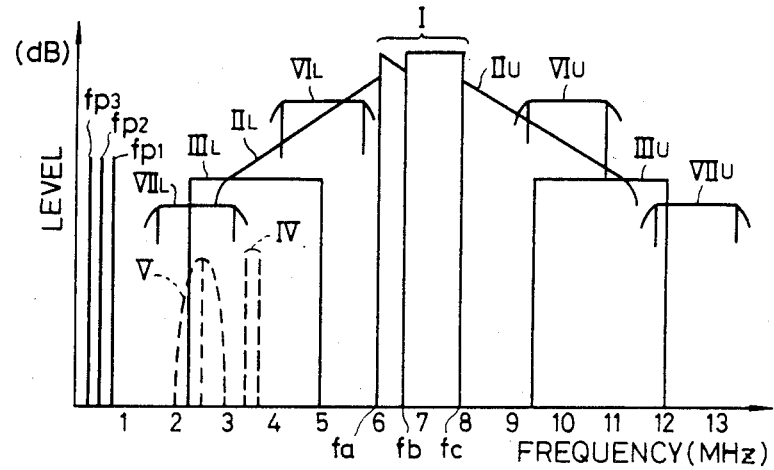
FIG. 3 is a graph showing a frequency spectrum of a frequency-modulated multiplexed signal recorded on the rotary recording medium shown in FIG. 1.

A frequency-modulated multiplexed signal having a frequency spectrum indicated by a solid line in FIG. 3 is obtained by frequency-modulating a carrier having a frequency of 6.6 MHz by the multiplexed information signal having the frequency spectrum shown in FIG. 2. In FIG. 3, a band I indicates a carrier deviation band of the frequency-modulated luminance signal obtained by frequency-modulating the above carrier. A frequency fa represents the frequency of 6.1 MHz corresponding to a tip of the synchronizing signal of the luminance signal, frequency fb represents the frequency of 6.6 MHz corresponding to a pedestal of the luminance signal, and frequency fc represents a frequency of 7.8 MHz corresponding to a white peak of the luminance signal. In addition, bands $II_U$ and $II_L$ respectively represent upper and lower side bands of the frequency-modulated luminance signal. Bands $III_U$ and $III_L$ respectively represent upper and lower side bands of signals obtained by further frequency-modulating the above carrier by the first and second frequency-modulated audio signals. The frequency spectrums of the first and second frequency-modulated audio signals are indicated by A1 and A2 in FIG. 2 and by a broken line IV in FIG. 3. Moreover, a frequency spectrum of the carrier chrominance signal is indicated by a broken line V which corresponds to the band indicated by C in FIG. 2. This frequency spectrum of the carrier chrominance signal indicated by the broken line V is converted into first side bands $VI_U$ and $VI_L$ and second side bands $VII_U$ and $VII_L$, through the above frequency modulation.

In FIG. 3, frequency spectrums of first, second, and third reference signals for tracking control, are respectively indicated by fp1, fp2, and fp3. Accordingly, among the signals in the frequency spectrums indicated by solid lines in FIG. 3 which are recorded onto the disc 10 as rows of intermittent pits, the signals in the bands indicated by solid lines I, $II_U$, $II_L$, $III_U$, $III_L$, $VI_U$, $VI_L$, $VII_U$, and $VII_L$ and the third reference signal fp3 are recorded on a main track with a rate of four fields for one track turn of the disc 10, for example. In addition, the first and second reference signals fp2 and fp3 are alternately recorded on each track turn between the main track.

The frequency-modulated multiplexed signal of the frequency spectrum shown in FIG. 3 is recorded on the disc 10, and this frequency-modulated multiplexed signal is picked up and reproduced by the signal pickup device 12 and supplied to the tracking control circuit 15 and the intermodulation distortion reducing circuit 16 as described before. The tracking control circuit 15 forms the tracking control signal based on the first, second, and third reference signals, and supplies the tracking control signal to the tracking coil within the signal pickup device as previously described.

Figure 4:
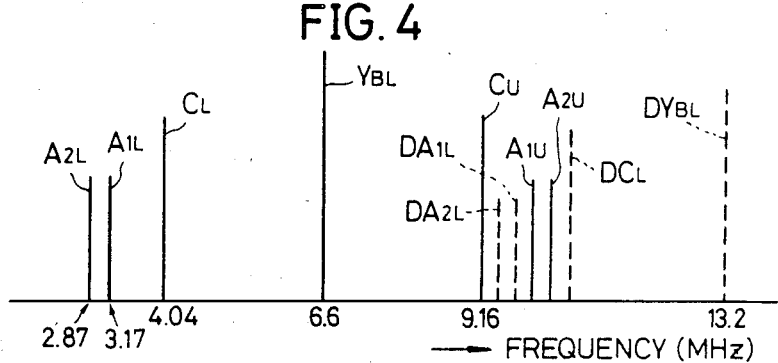
FIG. 4 is a graph showing a frequency spectrum for indicating the relationship between a carrier frequency and an intermodulation distortion component.

The above frequency-modulated multiplexed signal thus picked up by the signal pickup device 12 includes the intermodulation distortion component. If the video information of the color video signal within the frequency-modulated multiplexed signal relates to an entirely black picture, for example, the frequency spectrums of each of the frequency-modulated carriers become as shown by solid lines in FIG. 4. In FIG. 4, a signal $Y_{BL}$ having a frequency of 6.6 MHz indicates the frequency-modulated luminance signal (this frequency corresponds to the pedestal of the luminance signal). Signals $C_U$ and $C_L$ having frequencies of 4.04 MHz and 9.16 MHz respectively indicate chrominance subcarrier frequencies in the upper and lower side bands of the frequency-modulated carrier chrominance signal. Further, signals $A_{1U}$ and $A_{1L}$ having frequencies of 3.17 MHz and 10.03 MHz respectively indicate audio carrier frequencies in the upper and lower side bands of the frequency-modulated audio signal which is obtained by frequency-modulating the carrier by the first frequency-modulated audio signal. Moreover, signals $A_{2U}$ and $A_{2L}$ respectively indicate audio carrier frequencies in the upper and lower side bands of the frequency-modulated signal which is obtained by frequency-modulating the carrier by the second frequency-modulated audio signal.

When intermodulation distortion exists within the frequency-modulated signal, an intermodulation distortion component $DY_{BL}$ having a frequency of 13.2 MHz which is twice the carrier frequency of the luminance signal, is introduced as indicated by a broken line in FIG. 4. In addition, intermodulation distortion components having frequencies of 13.2 MHz±2.56 MHz, 13.2 MHz±3.43 MHz, and 13.2 MHz±3.73 MHz are also introduced. In FIG. 4, a broken line $DC_L$ indicates a frequency of 10.64 MHz corresponding to the intermodulation distortion component of the carrier chrominance signal, and broken lines $DA_{1L}$ and $DA_{2L}$ respectively indicate frequencies of 9.77 MHz and 9.47 MHz corresponding to the intermodulation distortion components of the first and second frequency-modulated audio signals. As seen from FIG. 4, the intermodulation distortion components $DA_{1L}$ and $DA_{2L}$ of the the first and second frequency-modulated audio signals, having the frequencies of 9.77 MHz and 9.47 MHz, become mixed within the first band indicated by $VI_U$ in FIG. 3 of the frequency-modulated carrier chrominance signal. As a result, color beat is generated in the reproduced picture, and degradation is introduced in the picture quality. Especially because the frequency of the intermodulation distortion component $DA_{2L}$ is close to the frequency of the upper side band $C_U$ of the frequency-modulated carrier chrominance signal, problems are likely to occur. FIG. 4 shows the case where the picture is entirely black, however, if the picture is entirely gray, the intermodulation distortion component $DC_L$ may overlap with the upper side bands $A_{1U}$ and $A_{2U}$ of the frequency-modulated audio signals. In such a case, degradation is introduced in the sound quality of the reproduced sound.

When the intermodulation distortion is generated in the frequency-modulated signal, the intermodulation distortion components of the first and second frequency-modulated audio signals will introduce no problems if the luminance information is related to a picture which is entirely white. However, as the luminance information becomes related to darker pictures, the intermodulation distortion components become mixed within the bands of the first and second frequency-modulated audio signals or the band of the frequency-modulated carrier chrominance signal, to introduce sound beat or color beat.

The intermodulation distortion reducing circuit 16 according to the present invention eliminates the intermodulation distortion component so that the problems described heretofore are not introduced. Description with respect to the construction and operation of the intermodulation distortion reducing circuit 16 according to the present invention will now be given by referring to FIG. 5 and the following figures.

Figure 5:
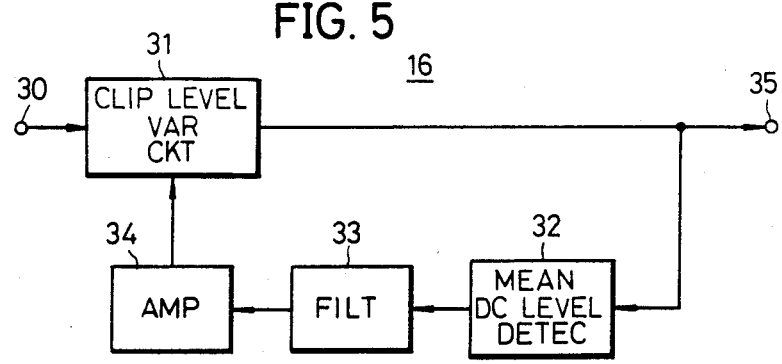
FIG. 5 is a system block diagram showing an embodiment of an intermodulation distortion reducing circuit according to the present invention.
Figure 6:
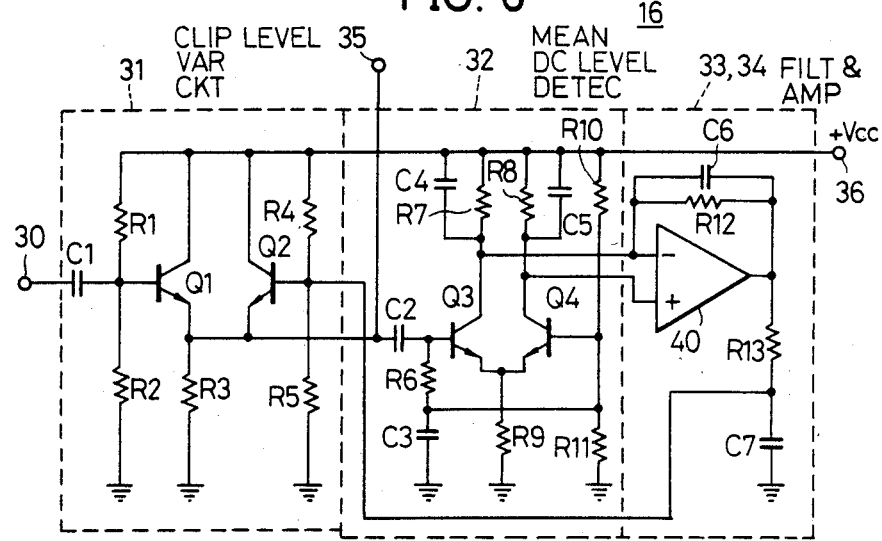
FIG. 6 is a schematic diagram showing an embodiment of an actual circuit of the block system shown in FIG. 5.
Figure 7A:
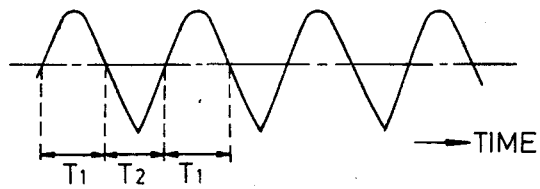
FIGS. 7A and 7B respectively are graphs for explaining the operation of the circuit shown in FIG. 6.

FIG. 5 shows a block diagram of the intermodulation distortion reducing circuit 16, and FIG. 6 shows an actual schematic diagram of the intermodulation distortion reducing circuit 16. In FIGS. 5 and 6, those parts which are the same are designated by the same reference numerals. In FIGS. 5 and 6, the reproduced frequency-modulated multiplexed signal which is applied to an input terminal 30 from the head amplifier 14, is in a relationship with respect to an average DC level such that a time relation of 1:1 (50% duty cycle) exists between a positive half cycle and a negative half cycle when the intermodulation distortion does not exist. However, when the intermodulation distortion exists, the reproduced frequency-modulated multiplexed signal is in a relationship with respect to the average DC level indicated by a one-dot chain line in FIG. 7A, such that intervals of the positive and negative half cycles are different. This reproduced frequency-modulated multiplexed signal is passed through a clip level varying circuit 31 which acts as a sinusoidal wave shaping circuit, and produced through an output terminal 35. On the other hand, the reproduced frequency-modulated multiplexed signal is supplied to a mean DC level detecting circuit 32 wherein a zero crossing level (or mean DC level) is detected.

As shown in FIG. 6, the clip level varying circuit 31 comprises NPN type transistors Q1 and Q2, base biasing resistors R1 through R5, and a coupling capacitor C1. The transistor Q1 has its base connected to the input terminal 30 through the coupling capacitor C1, and its emitter connected to the emitter of the transistor Q2. The emitters of the transistors Q1 and Q2 are grounded through the resistor R3. The resistors R1 and R2 are respectively connected to the base of the transistor Q1, while the resistors R3 and R4 are respectively connected to the base of the transistor Q2. The base of the transistor Q2 is connected to a connection point between a resistor R13 and a capacitor C7 which will be described hereinafter. The mean DC level detecting circuit 32 comprises NPN type transistors Q3 and Q4, resistors R6 through R11, and capacitors C2 through C5 as shown in FIG. 6. The transistor Q3 has its base connected to the coupling capacitor C2 which is connected to the respective emitters of the transistors Q1 and Q2. A series circuit consisting of the resistor R6 and the capacitor C3 is connected between the base of the transistor Q3 and ground. A parallel circuit consisting of the capacitor C4 and the resistor R7 constitute a filter for smoothing, and is connected between the collector of the transistor Q3 and an input terminal 36 supplied with a power source voltage +Vcc. The emitters of the transistors Q3 and Q4 are connected to each other, and grounded through the resistor R9. A parallel circuit consisting of the capacitor C5 and the resistor R8 constitutes a filter for smoothing, and is connected between the collector of the transistor Q4 and the input terminal 36. The resistors R10 and R11 are provided for obtaining a constant reference voltage for detecting the mean DC level, and are respectively connected to the base of the transistor Q4. The base of the transistor Q4 is also connected to a connection point between the resistor R6 and the capacitor C3. The transistors Q3 and Q4 constitute a differential amplifier.

As shown in FIG. 5, the output signal of the mean DC level detecting circuit 32 is passed through a filter 33 and an amplifier 34, and supplied to the clip level varying circuit 31 to variably control the clip level. The filter 33 is provided in order to stabilize the operation of a closed loop including the clip level varying circuit 31, the mean DC level detecting circuit 32, and the amplifier 34. In FIG. 6, an operational amplifier 40 and a gain determining resistor R12 which is connected between an output terminal and an inverting input terminal of the operational amplifier 40, constitute the amplifier 34 shown in FIG. 5. In addition, a capacitor C6 connected in parallel with the resistor R12, and a resistor R13 and a capacitor C7 connected between the output terminal of the operational amplifier 40 and ground, constitute the filter 33 shown in FIG. 5.

Description will now be given with respect to the operation of the intermodulation distortion reducing circuit 16 having the above described construction. It will be assumed that the frequency-modulated multiplexed signal applied to the input terminal 30 includes the intermodulation distortion shown in FIG. 7A. The DC component of this frequency-modulated multiplexed signal is blocked by the capacitor C1. The signal obtained through the capacitor C1 passes through the transistor Q1 operating as an emitter follower and the capacitor C2, and is applied to the base of the transistor Q3. The transistors Q3 and Q4 are base-biased by the same bias voltage. The transistor Q3 is ON during an interval T1 in which the level is higher than the mean DC level (zero crossing level) indicated by a one-dot chain line in FIG. 7A. On the other hand, the transistor Q4 is ON during an interval T2 in which the level is lower than the mean DC level. Because the intervals T1 is longer than the interval T2 due to the inclusion of the intermodulation distortion in the frequency-modulated multiplexed signal, an interval in which the transistor Q3 is ON is longer than an interval in which the transistor Q4 is ON. Therefore, the collector voltage of the transistor Q3 becomes lower than the collector voltage of the transistor Q4.

Figure 7B:
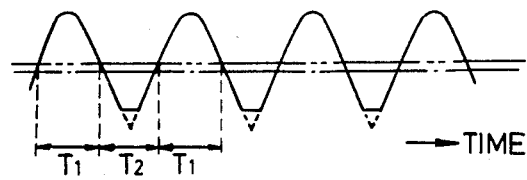

The collector voltages of the respective transistors Q3 and Q4 are independently applied to the inverting input terminal and the non-inverting input terminal of the operational amplifier 40. Thus, the output voltage of the operational amplifier 40 becomes larger compared to the case where no intermodulation distortion is included in the frequency-modulated multiplexed signal. The output voltage of the operational amplifier 40 is applied to the base of the transistor Q2, and an increase in this output voltage of the operational amplifier 40 increases the clip level by an amount corresponding to this increase in the output voltage. Accordingly, a part of the lower half of the waveform of the frequency-modulated multiplexed signal supplied from the emitter of the transister Q1 to the base of the transistor Q3 through the capacitor C2, becomes clipped as shown in FIG. 7B. As a result, the mean DC level changes to a level indicated by a two-dot chain line from the level indicated by the one-dot chain line. Hence, the interval T1 in which the transistor Q4 is ON becomes short, and assumes a value close to the interval T2 in which the transistor Q4 is ON. Operations similar to those described heretofore are repeatedly carried out thereafter, and the closed loop constituted by the clip level varying circuit 31, the mean DC level detecting circuit 32, the filter 33, and the amplifier 34 operates so that the interval T1 in which the transistor Q3 is ON becomes equal to the interval T2 in which the transistor Q4 is ON.

Accordingly, a frequency-modulated multiplexed signal having a waveform in which the intervals of the positive and negative cycles are approximately equal, that is, having a waveform closely approximating a sinusoidal waveform with 50% duty cycle, is obtained from the emitter of the transistor Q1 within the clip level varying circuit 31. This frequency-modulated multiplexed signal obtained from the emitter of the transistor Q1, is supplied to a lowpass filter 17 shown in FIG. 1 through the output terminal 35. The lowpass filter 17 has a cutoff frequency of 12 MHz, and eliminates the unwanted frequency component within the input frequency-modulated multiplexed signal having the waveform shown in FIG. 7B wherein a part of the waveform is clipped. Moreover, the lowpass filter 17 subjects the input frequency-modulated multiplexed signal to wave-shaping, so as to produce the input frequency-modulated multiplexed signal as a sinusoidal wave. The amplitude of the frequency-modulated multiplexed signal obtained from the lowpass filter 17 is limited by a limiter 18. An amplitude-limited output signal of the limiter 18 is then supplied to a demodulating circuit 19 wherein the signal is frequency-demodulated.

The intermodulation distortion of the input frequency-modulated multiplexed signal to the demodulating circuit 19 is reduced or eliminated as described before. Hence, the demodulation can be carried out by the demodulating circuit 19 without the beat interference caused by the intermodulation distortion components of the first and second frequency-modulated audio signals mixed within the demodulating frequency band. Thus, the demodulation is carried out with a satisfactory signal-to-noise (S/N) ratio at the demodulating circuit 19, and the multiplexed signal having the frequency spectrum shown in FIG. 2 produced by the demodulating circuit 19 is supplied to a signal processing circuit (not shown) in a subsequent stage through an output terminal 20.

According to experimental results obtained by the present inventor, it has been confirmed that when the intermodulation distortion reducing circuit according to the present invention is used, the S/N ratio of the demodulated luminance signal of the frequency-modulated multiplexed signal reproduced from the main track at the inner peripheral part of the disc 10 is improved by 4 dB to 5 dB compared to the case where the conventional circuit is used. Moreover, it has also been confirmed that the S/N ratios of the phase component and the amplitude component of the demodulated carrier chrominance signal are respectively improved by 4 dB to 5 dB compared to the case where the conventional circuit is used.

Figure 8:
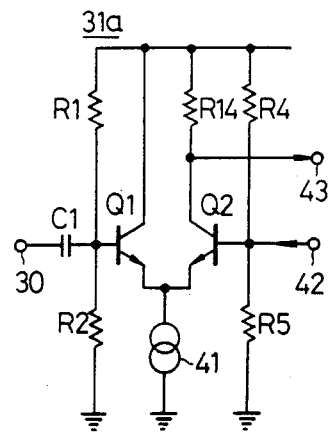
FIG. 8 is a circuit diagram showing another embodiment of an actual circuit constituting a part of the block system shown in FIG. 5.

FIG. 8 shows an embodiment of a clip level varying circuit 31a. In FIG. 8, those parts which are the same as those corresponding parts of the clip level varying circuit 31 shown in FIG. 6 are designated by the same reference numerals, and their description will be omitted. The emitters of the transistors Q1 and Q2 are respectively connected and grounded through a constant current source 41. These transistors Q1 and Q2 constitute a differential amplifier. The mean DC level detection signal from the amplifier 34 is supplied to the base of the transistor Q2 through a termnal 42. A terminal 43 is connected to a connection point between the collector of the transistor Q2 and a resistor R14, and an output obtained through this terminal 43 is supplied to the output terminal 35 and the mean DC level detecting circuit 32. According to the present embodiment, the collector currents of the transistor Q1 and Q2 assume the same value and are respectively equal to ½ the maximum value when the difference between the respective base voltages of the transistors Q1 and Q2 is zero, as is well known. On the other hand, as the base voltage of the transistor Q1 becomes higher than the base voltage of the transistor Q2, the collector current of the transistor Q1 becomes larger while the collector current of the transistor Q2 becomes lower. On the contrary, if the base voltage of the transistor Q1 becomes lower than the base voltage of the transistor Q2, the collector current of the transistor Q1 becomes lower while the collector current of the transistor Q2 becomes higher. Hence, regardless of whether the intermodulation distortion is generated in the positive or negative half cycle of the frequency-modulated multiplexed signal applied to the input terminal 30, it is possible to clip the side of the waveform in which the intermodulation distortion is generated, and the circuit may also be used as a limiter.

The clip level varying circuit 31 shown in FIG. 6 is designed to carry out the clipping in one stage. However, the clip level varying circuit 31 may be designed to carry out the clipping in a plurality of stages so as to form the waveform into a waveform closely approximating a sinusoidal wave.

Further, the present invention is not limited to these embodiments, but various variations and modifications may be made without departing from the scope of the present invention.

What is claimed is:

1. An intermodulation distortion reducing circuit for a frequency-modulated signal, said intermodulation distortion reducing circuit comprising: a sinusoidal wave shaping circuit supplied with an input frequency-modulated signal including an intermodulation distortion component for shaping a carrier waveform of said input frequency-modulated signal into a waveform closely approximating a sinusoidal wave; and a mean DC level detecting circuit supplied with an output signal of said sinusoidal wave shaping circuit, for detecting a mean DC level of said output signal of said sinusoidal wave shaping circuit and producing a detection output, said sinusoidal wave shaping circuit being supplied with the detection output of said mean DC level detecting circuit and a waveform shaping quantity of said sinusoidal wave shaping circuit being varied to obtain a carrier waveform which closely approximates a sinusoidal waveform having a duty cycle of 50%, to produce a frequency-modulated signal having a waveform closely approximating a sinuosidal waveform with its intermodulation distortion component reduced.

2. An intermodulation distortion reducing circuit as claimed in claim 1 in which said sinusoidal wave shaping circuit comprises a clip level varying circuit, said clip level varying circuit being supplied with the detection output of said mean DC level detecting circuit, a clip level of said clip level varying circuit with which said input frequency-modulated signal is clipped being varied according to the detection output of said mean DC level detecting circuit.

3. An intermodulation distortion reducing circuit as claimed in claim 1 which further comprises a filter coupled to said mean DC level detecting circuit, for stabilizing the operation of a loop including said sinusoidal wave shaping circuit and said mean DC level detecting circuit.

4. An intermodulation distortion reducing circuit as claimed in claim 2 in which said clip level varying circuit comprises a first transistor supplied with said input frequency-modulated signal to its base, and a second transistor having its emitter commonly connected with an emitter of said first transistor, said commonly connected emitters of said first and second transistors respectively coupled to the input of said mean DC level detecting circuit, and a base of said second transistor being supplied with the detection output of said mean DC level detecting circuit.

5. An intermodulation distortion reducing circuit as claimed in claim 2 in which said clip level varying circuit comprises a first transistor supplied with said input frequency-modulated signal to its base, and a second transistor having its emitter commonly connected with an emitter of said first transistor, a collector of said second transistor coupled to the input of said mean DC level detecting circuit, and a base of said second transistor being supplied with the detection output of said mean DC level detecting circuit.

6. An intermodulation distortion reducing circuit as claimed in claim 1 in which said input frequency-modulated signal is a frequency-modulated multiplexed signal obtained by frequency-modulating a carrier having a predetermined frequency with a multiplexed signal consisting of a color video signal and a frequency-modulated audio signal.

* * * * *